United States Patent
Cassell

(10) Patent No.: US 10,274,020 B2
(45) Date of Patent: Apr. 30, 2019

(54) VENTED DRIVELINE JOINT

(71) Applicant: GKN Driveline North America, Inc., Auburn Hills, MI (US)

(72) Inventor: Robert L. Cassell, Lake Orion, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 28 days.

(21) Appl. No.: 15/342,538

(22) Filed: Nov. 3, 2016

(65) Prior Publication Data
US 2018/0119748 A1    May 3, 2018

(51) Int. Cl.
| F16D 3/84 | (2006.01) |
| F16D 3/224 | (2011.01) |
| F16D 3/2245 | (2011.01) |
| F16J 3/00 | (2006.01) |
| F16D 3/223 | (2011.01) |

(52) U.S. Cl.
CPC ........... *F16D 3/845* (2013.01); *F16D 3/2245* (2013.01); *F16J 3/00* (2013.01); *F16D 2003/22316* (2013.01); *F16D 2003/846* (2013.01)

(58) Field of Classification Search
CPC .... F16D 3/845; F16D 3/848; F16D 2003/846; F16D 2003/22316; F16J 3/046; F16J 15/162; F16J 15/52; F16J 15/525; Y10T 403/31; Y10T 403/315
USPC ....... 464/15, 173–175; 403/50, 51; 277/552, 277/634–636; 74/18–18.2
See application file for complete search history.

(56) References Cited

U.S. PATENT DOCUMENTS

| 2,323,569 | A | * | 7/1943 | Rzeppa | F16D 3/845 |
| | | | | | 464/173 |
| 3,204,427 | A | * | 9/1965 | Dunn | F16D 3/2052 |
| | | | | | 464/175 |
| 4,403,781 | A | | 9/1983 | Riemscheid | |
| 5,807,180 | A | | 9/1998 | Knodle et al. | |
| 6,264,568 | B1 | | 7/2001 | Frazer et al. | |
| 6,820,876 | B2 | * | 11/2004 | Iwano | F16D 3/845 |
| | | | | | 464/175 |
| 7,063,331 | B2 | * | 6/2006 | Iwano | F16D 3/845 |
| | | | | | 464/173 |
| 7,229,356 | B2 | * | 6/2007 | Iwano | F16D 3/845 |
| | | | | | 464/173 |
| 7,470,198 | B2 | | 12/2008 | Cermak | |
| 7,997,988 | B2 | | 8/2011 | Wormsbaecher et al. | |

(Continued)

FOREIGN PATENT DOCUMENTS

GB    1452991 A    10/1976

*Primary Examiner* — Josh Skroupa
(74) *Attorney, Agent, or Firm* — Jennifer M. Brumbaugh; Reising Ethington P.C.

(57) ABSTRACT

A joint for coupling two shafts in a vehicle driveline includes a joint part having a bore defining part of a fluid chamber, a boot member coupled to the joint part and defining at least part of the fluid chamber and having a valve portion that has an open state and a closed state, and an insert. The insert may be received adjacent to the boot member and defines at least part of a vent path that communicates the fluid chamber with the valve portion. When the valve portion is in the closed state venting from the vent chamber is inhibited or prevented and when the valve portion is in the open state the vent chamber is communicated with a venting space.

24 Claims, 4 Drawing Sheets

(56) References Cited

U.S. PATENT DOCUMENTS

| | | |
|---|---|---|
| 8,235,395 B2 | 8/2012 | Cermak |
| 8,834,279 B2 * | 9/2014 | Oh ......................... F16D 3/845 |
| | | 464/17 |
| 9,777,777 B2 * | 10/2017 | Oh |
| 2016/0040785 A1 * | 2/2016 | Hermanski .............. F16J 3/046 |
| | | 277/635 |

* cited by examiner

VENTED DRIVELINE JOINT

TECHNICAL FIELD

The present disclosure relates generally to a vehicle driveline joint including a vent.

BACKGROUND

Constant velocity joints (CV joints) are common components in vehicles. CV joints are often employed where transmission of a constant velocity rotary motion is desired or required. CV joints are typically greased or otherwise lubricated for the life of the component. The joints are preferably sealed to retain the lubricant inside the joint while keeping contaminants and foreign matter, such as water and dirt, out of the joint. A boot, which may be made of rubber, thermoplastic, silicone material, or the like, usually encloses portions of the CV joints. The boot provides a flexible barrier to retain the grease in the joint and extend the life of the joint.

SUMMARY

In at least one implementation, a joint for coupling two shafts in a vehicle driveline includes a joint part having a bore defining part of a fluid chamber, a boot member coupled to the joint part and defining at least part of the fluid chamber and having a valve portion that has an open state and a closed state, and an insert. The insert may be received adjacent to the boot member and defines at least part of a vent path that communicates the fluid chamber with the valve portion. When the valve portion is in the closed state venting from the vent chamber is inhibited or prevented and when the valve portion is in the open state the vent chamber is communicated with a venting space.

In at least one implementations, a joint for coupling two shafts in a vehicle driveline includes an outer race having a bore, an inner race received at least partially within the bore, a cage received between the inner race and the outer race, a plurality of balls received between the inner joint and the outer joint and retained by the cage, a boot member, and an insert. The boot member may be coupled to the outer race, the inner race or both the outer race and the inner race, has an annular portion and may define at least part of a fluid chamber. The insert may be received adjacent to the boot member and defines at least part of a vent path that communicates the fluid chamber with the valve portion and has a circumferentially continuous engagement or contact surface engaged by the annular portion of the boot member to define a valve. The valve may have an open state and a closed state. When the valve is in the closed state venting from the fluid chamber is inhibited or prevented and when the valve is in the open state the fluid chamber is communicated with a venting space.

BRIEF DESCRIPTION OF THE DRAWINGS

The following detailed description of preferred embodiments and best mode will be set forth with reference to the accompanying drawings, in which.

DETAILED DESCRIPTION

Figure 1:
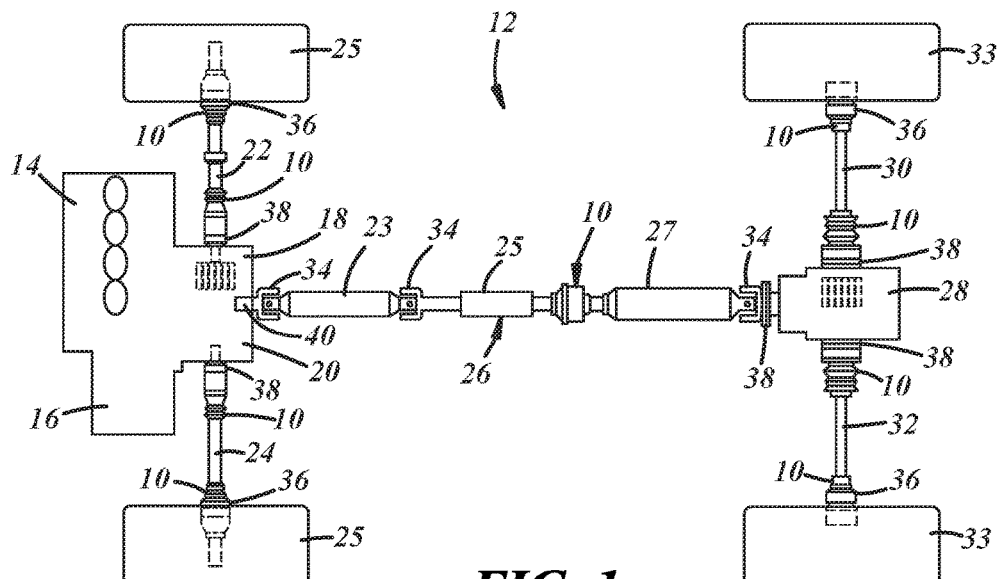
FIG. 1 is a diagrammatic plan view of a four-wheel drive vehicle driveline.

Referring in more detail to the drawings, FIG. 1 illustrates a driveline 12 for a all wheel drive automobile. While an all wheel drive system is shown and described, the concepts here presented could apply to a single drive unit system or multiple drive unit systems, including rear wheel drive only vehicles, front wheel drive only vehicles, and four-wheel drive vehicles. In this example, the drive system 12 includes an engine 14 that is connected to a transmission 16 which is connected to a power take-off unit 18. A front differential 20 has a right side half shaft 22 and left side half shaft 24 which are connected to different front wheels 25 of the vehicle and deliver power to the wheels 25. On both ends of the right side half shaft 22 and left side half shaft 24 are constant velocity joints 10. A propeller shaft 26 connects the front differential 20 to a rear differential 28 wherein the rear differential 28 includes a rear right side shaft 30 and a rear left side shaft 32, each of which are connected to different rear wheels 33. Constant velocity joints (CVJ) 10 are located on both ends of the half shafts 30, 32 that connect to the wheels and the rear differential 28. The propeller shaft 26, shown in FIG. 1, is a three-piece propeller shaft that includes interconnecting shafts 23, 25, 27 coupled together by a plurality of Cardan joints 34 and one high-speed constant velocity joint 10.

The constant velocity joints 10 transmit power to the wheels through the propeller shaft 26 even if the wheels or the propeller shaft 26 have changed angles due to steering, raising, or lowering of the suspension of the vehicle. The constant velocity joints 10 may be any of the standard types known, such as a plunging tripod, a cross groove joint, a fixed ball joint, a fixed tripod joint, or a double offset joint, all of which are commonly known terms in the art for different varieties of constant velocity joints 10. The constant velocity joints 10 allow for transmission of constant velocities at angles typically encountered in every day driving of automotive vehicles in both the half shafts, interconnecting shafts and propeller shafts of these vehicles. Optionally, each Cardan joint 34 may be replaced with any other suitable type of joint, including constant velocity joint types. The shafts 22, 23, 24, 25, 27, 30, 32 may be solid or tubular with ends adapted to attach each shaft to an inner race or an outer race of a joint in accordance with a traditional connection, thereby allowing the outer race or inner race to be connected to a hub connector 36, a flange 38 or stubshaft 40 of each drive unit, as appropriate, for the particular application.

The shafts may also be coupled to a CVJ in a direct torque flow (DTF) arrangement, wherein the term direct torque flow (DTF) refers to a connection from the inner race of a constant velocity joint to the shaft of a differential, transmission or transfer case, generally supplied by another entity form the entity that manufactures the CVJ. Also, as used herein, a DTF connector refers to a joint coupled to a shaft that forms a DTF shaft assembly. Only together with the shaft of a differential, for example, does a DTF connector combine to make a DTF connection. It is recognized that the shaft of the drive unit may include the shaft of any input or output drive unit and is not necessarily limited to a shaft of a differential, transmission or transfer case.

Figure 2:
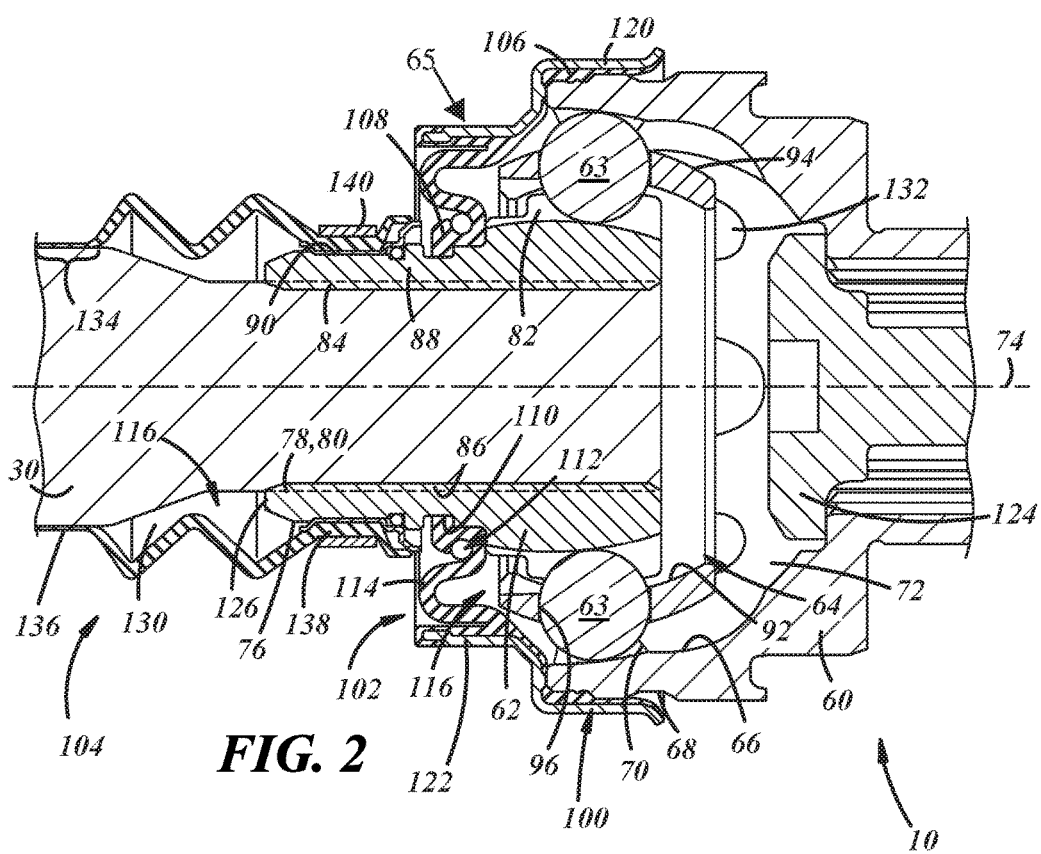
FIG. 2 is a cross-sectional view of a constant velocity joint used in the driveline of FIG. 1.

As shown in FIG. 2, the joint 10 may include first and second joint members, such as an outer race 60 and an inner race 62, with a ball cage 64, a plurality of balls 63 that couple together for co-rotation the inner race and the outer race and a boot or boot assembly 65. The outer race 60 generally has an inner bore 66 that may be partially spherical and an outer surface 68. The outer race 60 is generally made of steel, however, it should be noted that any other type of metal material, hard ceramic, plastic, or composite material, etc., may also be used for the outer race 60. The outer race 60 also includes a plurality of ball tracks 70 located on an inner surface 72 thereof, and having an axial length, radial depth and circumferential width, relative to a center axis 74 of the outer race. The ball tracks 70 may be curved relative to the axis 74 and the depth may vary along the length of each track. The ball tracks 70 may be axially opposed such that one half of the ball tracks open to a side of the outer race 60 opposite to that of the other half of the ball tracks, in any number of patterns. Optionally, for different types of CVJs, the ball tracks 70 all may open or axially align on the same side of the outer race. Also, the ball tracks 70 may be of an elliptical or other desired shape, as is understood by a person having skill in the art. While the CVJ 10 may be a DTF CVJ having a fixed CVJ arrangement, any constant velocity joint type may be utilized. Further, it is recognized the CVJ may be a fixed or plunging CVJ, including without limitation a Verschiebegelnk Loebro, Angular Contact, Double Offset, or tripod joints including other fixed or plunging CVJs. It is also contemplated that a joint may be made having any number of balls 63.

The inner race 62 may be arranged within the inner bore 66 of the outer race 60 and may be generally tubular having an outer surface 76 and an inner bore 78 defining an inner surface 80. A plurality of ball tracks 82 are formed in the outer surface 76 of the inner race 60 in an area axially overlapped by the outer race 60, and like the ball tracks 70 of the outer race 60, the inner race ball tracks 82 may be axially opposed, or otherwise arranged as desired. The ball tracks 82 may have a similar shape as and are aligned with the ball tracks 70 on the outer race 60. The ball tracks 82 of the inner race 62 may have one half of the ball tracks axially oriented in one direction while the other half of the ball tracks are axially oriented in the opposite direction. The ball tracks 82 may open in a pattern around the outer circumference of the inner race 62 in a matching relationship to that of the ball tracks 70 of the outer race 60. It should be noted that in this embodiment the inner race 62 is made of steel, however, any other metal composite, hard plastic, ceramic, etc., may also be used. One or more coupling features may be provided on the inner race 62 to facilitate coupling the inner race to the shaft (e.g. shaft 30) for co-rotation. In the example shown, the coupling features include a plurality of splines 84 that extend axially and radially to receive mating splines 86 on the exterior of the shaft 30. The splines 84, 86 may extend along all or part of the axial overlap between the inner race 62 and the shaft 30. In at least some implementations, the inner race 62 includes a tubular extension or projection 88 that extends axially from the portion of the inner race 62 including the ball tracks 82 so that at least a portion of the projection 88 is outboard of and is not overlapped by the outer race 60. A retention groove 90 may be formed in the exterior surface 76 of the inner race 62.

The ball cage 64 may be generally annular and have an inner surface 92 facing the inner race 62 and an outer surface 94 facing the outer race 60. The ball cage 64 is arranged within the inner bore 66 of the outer race 60 such that it is not, in this embodiment, in contact with the inner surface 72 of the outer race 60. The cage 64 has a plurality of opening or windows 96 formed radially through the cage. The number of windows may match the number of ball tracks 70, 82 on the outer race 60 and inner race 62 of the CVJ 10. The cage 64 may be made of a steel material but other metal materials, plastics, composites or ceramics, etc. may also be used.

The balls 63 of the constant velocity joint are each arranged within one or more windows 96 of the cage 64 and within a ball track 70, 82 of the outer race 60 and of the inner race 62, respectively. More than one ball 63 may be arranged within each of the windows 96 or there may be no balls 63 within a window. The balls 63 are capable of rolling or otherwise moving in the axially opposed tracks 70, 82 in response to relative movement between the outer race 60 and inner race 62.

The boot assembly 65 includes a shroud or boot can 100 and one or more flexible boot members that provide a protective barrier for the internal parts of the joint 10 and lubrication retention therein. In the implementation shown in FIGS. 2 and 3, two boot members are provided with a first boot member 102 connected to the boot can 100 and the inner race 62 and a second boot member 104 connected to the inner race 62 and the shaft 30. As will be set forth in more detail, the boot members 102, 104 define one or more fluid chambers that is/are communicated with a valve to permit venting of the fluid chamber(s) in at least some circumstances.

The first boot member 102 includes a first section 106 at one end and a second section 108 at the other end. The first section 106 of the boot member 102 is connected directly to the outer race 60 and further retained thereto by the boot can 100 which has a portion received about the outer surface 68 of the outer race 60. Optionally, the first section 106 of the boot member 102 may be attached to the boot can 100 and the boot can 100 can be coupled to the outer race 60 independently of the boot member 102. In the example shown, the boot member 102 is overmolded onto the boot can 100 with the first section 106 extending along an interior surface of the boot can 100 so that a portion of the first section is compressed between the boot can and the outer race 60 to provide a seal therebetween. The second section 108 of the boot member 102 is connected to an attachment surface 110 of the inner race 62 by resilient retention of the boot material, or by an optional retaining band or clamp ring 112. The attachment surface 110 may include a groove or other void into which a portion (e.g. a lip) of the boot member 102 extends to facilitate retention of the boot member 102 on the inner race 62 and to facilitate providing a seal between the boot member and the inner race. Between the first and second sections 106, 108, the boot member 102 may include a diaphragm portion 114 that extends from the boot can 100 to the inner race 62, to define part of a fluid chamber 116 open to the interior of the joint 10. In the example shown, the diaphragm portion 114 is generally S-shaped and has a bend or bellows that permits the diaphragm portion to accommodate movement of the inner race 62 relative to the outer race 60.

The boot member 102 may comprise any suitable material that is sufficiently flexible to allow the CVJ 10 to operate through a wide range of angles. Suitable materials include thermoplastic, rubber, silicone, plastic material and urethane, etc. Thermoplastic, rubber and silicone also provide good sealing properties for the boot member 102.

The boot can 100 is generally annular and may have a first portion 120 at an end coupled to the outer race 60 and a second portion 122 at an opposite end. The first portion 120 may trap the first section 106 of the boot member 102 against the outer race 60 to provide a seal between the boot can 100 and the outer race. In this embodiment, the first portion 120 is crimped within a circumferential channel located in the exterior of the outer race 60. The second portion 122 and/or a portion between the first and second portions 120, 122 supports the diaphragm portion 114 of the boot member 102 and radially retains the boot member within the boot can 100 in use, as the CVJ 10 undergoes angular and cyclic movements during operation. The boot can 100 may radially and axially overlie all or part of the boot member 102 to, among other things, protect the boot member by minimizing external impact from debris.

The boot can 100 may be made from metal or other materials, including plastics or composites, for example. For the boot can 100 of this embodiment, it is beneficial to use a suitable material in the compression or first portion 120 that is also deformable to provide the required retention force when crimping the boot can 100 to the CVJ 10.

In the example shown, at least part of the fluid chamber 116 is defined between the shaft 30, inner race 62, boot assembly 65, outer race 60 and optionally a cap or second shaft 124 coupled to the outer race. Due to the splines 84, 86 in the inner race 62 and shaft 30, the interface between the inner race 60 and the shaft 30 is not sealed (i.e. not hermetically or completely sealed). Hence, a fluid flow path exists out of the fluid chamber 116 through gaps defined by the splines 84, 86. In at least some implementations, an area outboard of the inner race 62 including a free end 126 of the inner race (e.g. the end of the projection 88) and a portion of the shaft 30 extending from the free end 126 of the inner race, is enclosed by the second boot member 104 (called a cover hereafter), which, in at least some implementations, may be considered part of the boot assembly 65 as noted above. Hence, the cover 104 defines part of the fluid chamber 116 along with the shaft 30 and part of the inner race 62. In at least some implementations, the portion of the fluid chamber 116 defined partially by the cover 104 may be called a vent chamber 130, and the portion of the fluid chamber 116 defined partially by the outer race 60 may be called a lubricant chamber 132. The vent chamber 130 is communicated with lubricant chamber 132 via the splines 84, 86, and fluid (e.g. air) may flow from the lubricant chamber 132 to the vent chamber 130 through gaps between the inner race 62 and the shaft 30, and these gaps may also be considered to be part of one or both of the vent chamber 130 and lubricant chamber 132.

The cover 104 may be attached at a first connection area 134 to the shaft 30, and may be sealed thereto such as by an adhesive or other bonding, a mechanical connector like a clamp, or by other suitable means. The first connection area 134 may include or be spaced inboard from a first end 136 of the cover 104. The cover 104 may also include a second connection area 138 that may be coupled to the inner race 62 by any suitable means, including an annular clamp 140 that clamps a portion of the cover 104 in the inner race groove 90 (which may serve to inhibit the cover 104 and clamp 140 from axially sliding relative to the inner race 62). The second connection area 138 may be axially spaced from boot member 102 or it may partially overlap an end of the boot member 102, if desired. Further, the second connection area 138 may be located inboard of a second end 142 (FIGS. 3 and 4) of the cover 104, and the cover may include a valve or a portion of a valve 144 that is located outboard of the second connection area 138. As used herein, inboard of the second end 142 means the feature is located between the first end 136 and second end 142, and outboard of the second end 142 means that the feature is not located axially between the ends 136, 142. Also as used herein, outboard of a connection area means that the feature is not located between the two connection areas of a boot or boot assembly, as is discussed in more detail later.

The valve or valve portion 144, as will be set forth in more detail below, can selectively communicate the vent chamber 130 with the atmosphere or a different space to permit venting of the vent chamber. In at least some implementations, the second end 142 of the cover 104 is outboard of the clamp 140 (relative to the vent chamber 130, i.e. on an opposite side of the clamp as the vent chamber) and includes a flange 145 that may extend axially and radially outwardly, providing a rim 146 that is radially larger than second connection area 138 of the cover 104 that is received within the inner race groove 90. The flange 145 and valve portion 144 may be circumferentially continuous. The cover 104 may be made of any suitable material any may be flexible to permit movement of the shaft 30. To facilitate providing a vent path between the cover 104 and the inner race 62, an insert 150 is provided between them.

Figure 3:
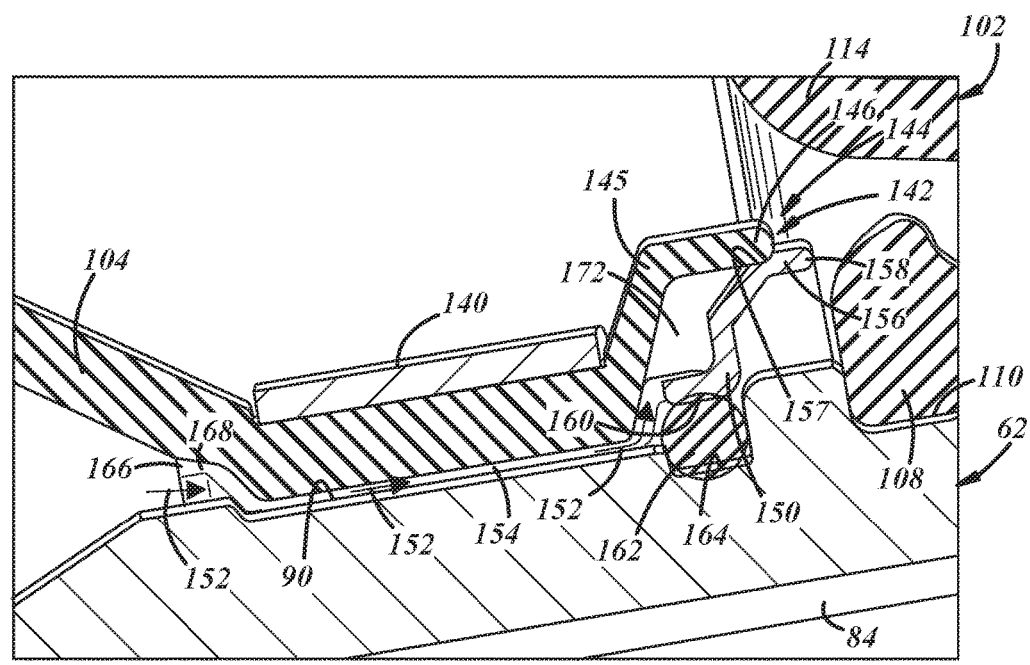
FIG. 3 is an enlarged sectional view of a portion of the joint shown in FIG. 2 illustrating a portion of a boot member, insert and inner race.
Figure 4:
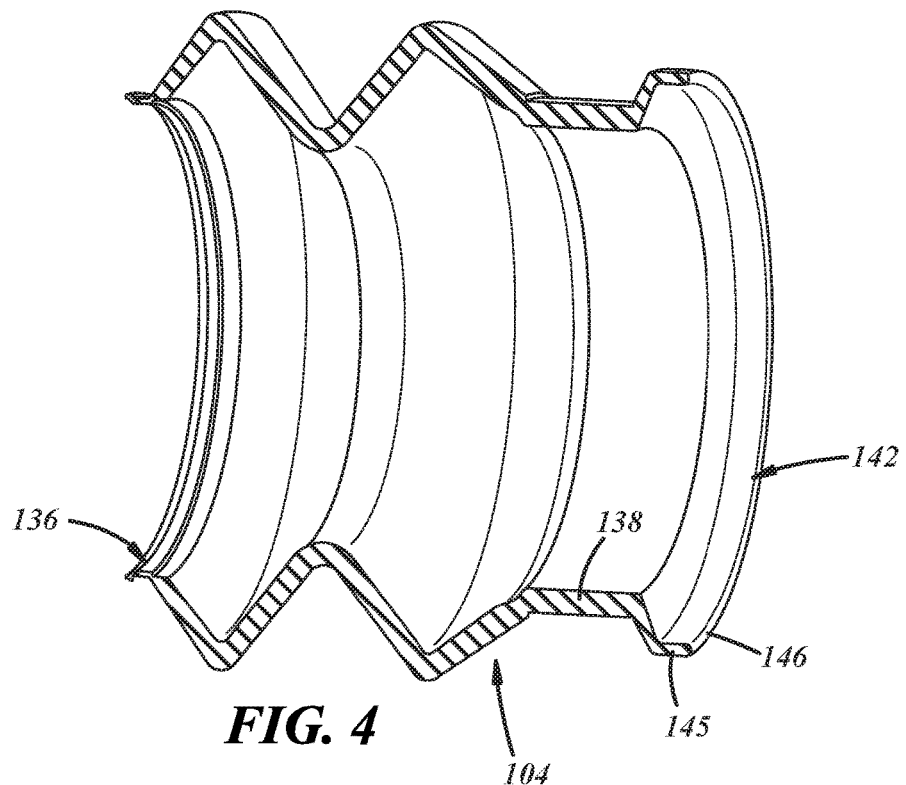
FIG. 4 is a sectional view of the boot member.
Figure 5:
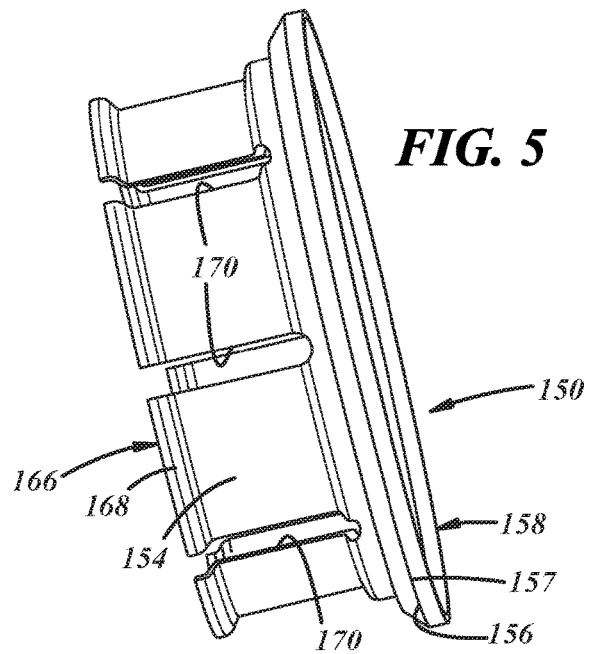
FIG. 5 is a perspective view of the insert.

The insert 150 defines at least part of a vent path (denoted by arrows 152) or port that selectively communicates the vent chamber 130 with an area outboard of the cover 104, which is some implementations is open to the atmosphere. As shown in FIGS. 3 and 5, the insert 150 may be generally annular and adapted to be received between the cover 104 and the inner race 62. In the implementation shown, the insert 150 includes an axially extending and generally cylindrical body portion 154 that may be received adjacent to, and in at least some implementations, within the groove 90 in the inner race 62 to facilitate locating the insert and retaining it relative to the inner race. The insert 150 may also include a generally annular flange 156 at or near one end that is adapted to cooperate with the cover flange 145 as will be set forth in more detail below. To provide a engagement or contact surface 157, at least a portion of the flange 156 inboard of its first end 158 may be circumferentially continuous. Likewise, to facilitate providing a seal between the insert 150 and the inner race 62, the insert may include an inwardly facing and circumferentially continuous sealing surface 160 arranged to engage a seal 162, such as an O-ring received between the insert and the inner race. In the example shown, the inner race 62 includes a peripheral, radially inwardly extending and circumferentially continuous groove 164 in which the seal 162 is received.

A second end 166 of the insert 150 may face or be in communication with the vent chamber 130 within the interior of the cover 104, and this end may include a radially outwardly extending rim 168 that may be located outboard of the groove 90 in assembly. The rim 168 may provide a seat against which the cover 104 is received, and a raised surface to facilitate retention of the insert when the cover 104 and insert 150 are clamped to the inner race 62 in assembly. One or more voids 170 (FIG. 5) may be formed in the insert 150 to define part of one or more vent paths 152 through which the vent chamber 130 is selectively communicated with the atmosphere (or a different area, chamber, or space as desired). In the implementation shown, the insert 150 includes a plurality of grooves 170 that extend axially across the inner race groove 90, each defining a separate vent path 152 that extends beneath the cover 104 and clamp 140. The grooves 170 may be circumferentially spaced apart, and may extend from the second end 166 of the insert 150 toward the first end 158 (e.g. rim 146), and in assembly, may be open to the seal 162 which prevents venting of fluid between the insert 150 and inner race 62. Instead, the fluid pressure in the vent chamber 130 is communicated through the vent passages 152 with an area or chamber 172 between the cover 104, insert 150 and seal 162 (which area may also be considered to define part of the vent passages).

In at least some implementations, the at rest or not expanded inner diameter of at least a portion of the cover flange 145 is smaller than the outer diameter of the insert contact surface 157 so that the cover flange 145 engages the insert 150 in a first state of the cover flange (i.e. an at rest state). The cover flange 145 is flexible and resilient, and at least a portion of the flange 145 may be moved out of engagement with the insert contact surface 157 under a threshold force. This permits the vent chamber 130 to be vented to the atmosphere (in the illustrated embodiment, the vent path 152 may lead elsewhere in other embodiments). In this way, the cover flange 145 defines at least part of the valve portion 144 of the cover 104. The force(s) that tend to open the valve portion 144 may be caused by fluid pressure that acts on the cover flange 145, centripetal force when the boot assembly 65 rotates, or both in combination. The force needed to displace a portion of the cover flange 145 off of the insert 150 may be called a cracking force or pressure and it can be adjusted in any desired way, including by use of a flexible band or other biasing member around the cover flange 145, by designing the cover flange of a certain shape, thickness, and/or of a material having desired flexibility or stiffness. To again close against the insert when the force on the flange is less than the threshold, the cover flange 145 is resilient (or otherwise acted upon by a resilient member, such as a spring, band or other biasing member).

In this way, an internal pressure within the lubricant chamber 132 may be vented from the lubricant chamber to prevent an overpressure condition which could damage the boot and/or a seal associated with the lubricant chamber and lead to a loss of lubricant or other problem in the joint 10. Further, during higher speed operation, the joint 10 is vented as centripetal forces on the flange 145 cause it to move away from the insert contact surface 157 to reduce heat build-up in the joint. However, during low speed operation, the valve portion 144 is not opened and the joint 10 is not directly vented to the atmosphere. This may be helpful during certain situations, such as where the vehicle is fording relatively deep water to prevent water from freely flowing into the cover 104 and perhaps into the joint through the splines. When fording relatively deep water, for example, the vehicle normally would be traveling at a low enough speed such that the threshold force is not acting on the cover flange 145 and the cover flange remains seated against the insert contact surface 157. In one example, the cover flange 145 opens to permit venting when the joint is rotated at 1,500 rpm or greater, although this is just one example.

Accordingly, in assembly, the seal 162 is placed into the groove 164 of the inner race 62, the insert 150 is slid onto the inner race 62 and seated in the groove 90, and then the second end 142 of the cover 104 is positioned over the insert 150 and end 126 of the inner race 62. An annular clamp or band 140 is then disposed over an exterior of the cover 104 overlying the groove 90 and tightened to secure the cover 104 and insert 150 relative to the inner race 62. The insert 150 may be formed of a material that is harder than the material of the boot member 104 so that the insert resists being compressed to avoid closing the void(s) 170 and the vent path(s) 152 being closed in assembly of the joint 10. The first end 136 of the cover 104 may then be secured to the shaft 30 that extends outwardly from the inner race 62. So connected, the vent chamber 130 is defined between the cover 104, shaft 30 and inner race 62 (and also the second end 166 of the insert 150, in the illustrated example). The vent chamber 130 communicates with the lubricant chamber 132 through gaps in the splines 84, 86 between the inner race 62 and shaft 30, and due to the viscosity of the lubricant within the lubricant chamber 132, primarily only air or other gaseous matter (e.g. vapors) flows between the inner race and shaft to the vent chamber 130.

Fluid in the vent chamber 130 may flow through the vent path(s) 152 defined at least in part by the slots 170 in the insert 150 and are thus, in communication with the chamber 172 and the valve portion 144 of the cover 104. When the pressure of the fluid acting on the valve portion 144 is above a threshold, at least a portion of the cover (e.g. a portion of the cover flange 145) will be displaced from the contact surface 157 of the insert 150 to communicate the vent chamber 130 with the atmosphere (or other vent space). Also, when the rotational velocity of the joint 10 is above a threshold, the centripetal force on the valve portion 144 will cause at least a portion thereof to separate from the insert 150 to permit venting of the vent chamber 130 to the atmosphere (or other vent space).

Figure 6:
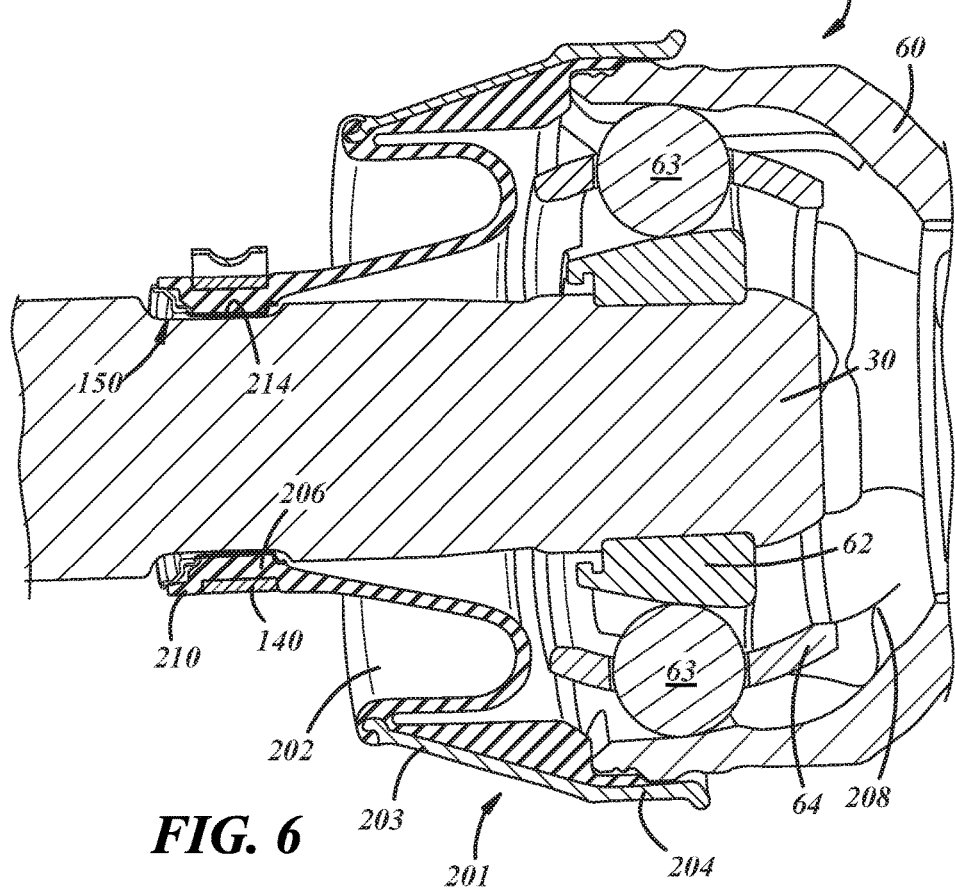
FIG. 6 is a cross-sectional view of a constant velocity joint that may be used in the vehicle driveline.
Figure 7:
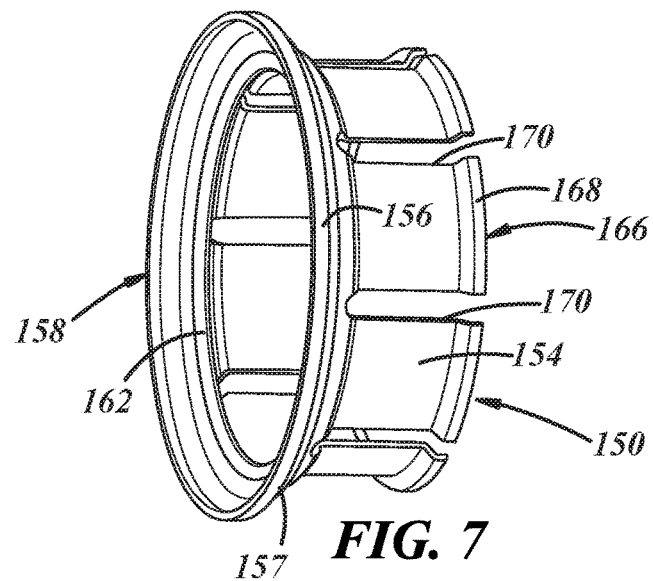
FIG. 7 is a perspective view of an insert used with the joint.
Figure 8:
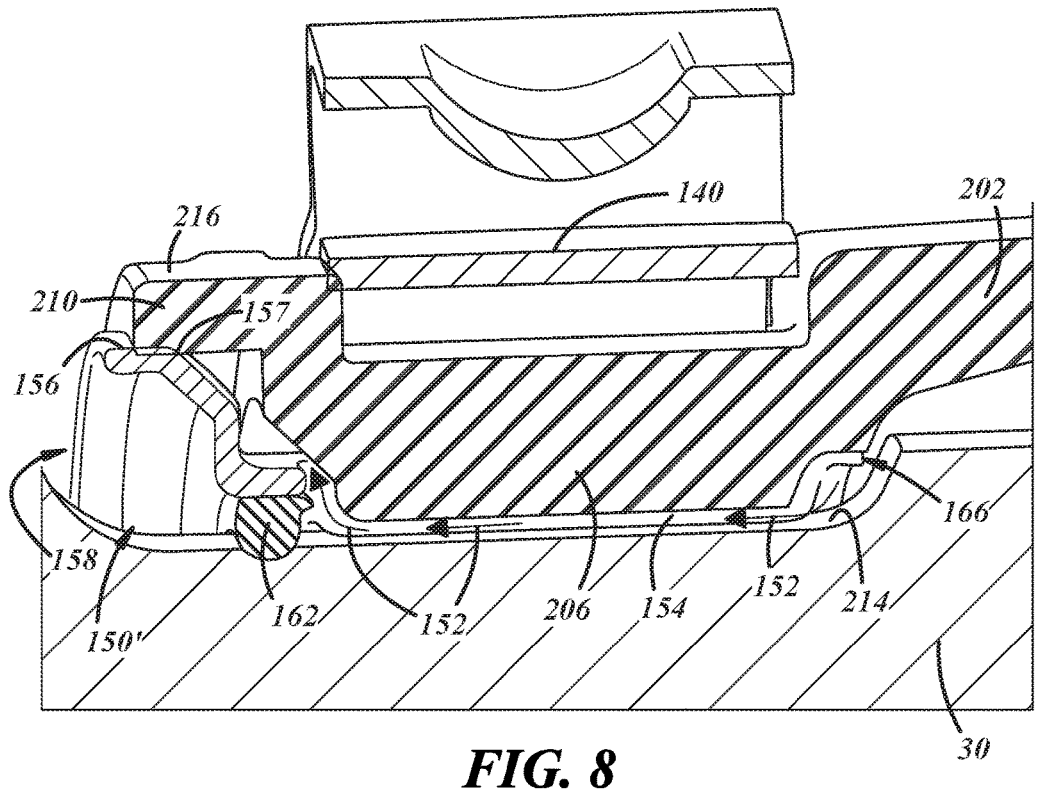
FIG. 8 is an enlarged sectional view of a portion of the joint shown in FIG. 6 illustrating a portion of a boot member, insert and a shaft that, in assembly, is coupled to the inner race.

FIGS. 6-8 show a vehicle driveline joint 200 (e.g. a CV joint) that includes several components that may be the same as, or similar to, components in the joint 10. Hence, similar reference numbers may be used to describe those components in the joint 200 as were used in description of the joint 10 and the various features of those components will not be repeated. The joint 200 includes a boot assembly 201 having a boot member 202 and a boot can 203. The boot 202 is coupled to the boot can 203 and the boot can 203 is coupled to the outer race 60 at a first connection area 204 of the boot assembly 201. The boot 202 may also be coupled to the outer race 60 as described with regard to the previously described joint 10. The boot 202 may be coupled to the shaft 30 at a second connection area 206, and the shaft is coupled to the inner race 62 in any desired manner (as shown, the inner race need not include a projection 88 as in the joint 10). The boot assembly 201 defines part of a lubricant chamber 208 with the outer race 60, inner race 62 and shaft 30. In this implementation, there is no second boot member (i.e. cover) and the boot 202 that defines the lubricant chamber 208 defines or includes a valve portion 210 that permits venting of the lubricant chamber 208 to the atmosphere or other vent space.

In this example, the insert 150 is arranged between the shaft 30 and the second connection area 206 of the boot 202. To facilitate location and retention of the insert 150 and second connection area 206 of the boot 202, the shaft 30 may include an inwardly extending circumferential groove 214 and a portion of the boot 202 and insert 150 may be received within the groove 214. Thereafter, a clamp 140, band or other connector may be used to firmly retain the second connection area 206 of the boot and the insert 150 within the groove 214 and in a desired position relative to the shaft 30. In this arrangement, the seal 162 is trapped between the insert 150 and the shaft 30. The seal 162 could be separate from the insert 150, it could be adhered or bonded by an adhesive to the insert 150, or the seal could be defined by material that is molded onto the insert 150 (or the insert could be molded about the seal) so that the seal and insert are a unitary component instead of separate components that must be handled and installed separately.

So arranged, the void(s) 170 in the insert 150 communicate with the lubricant chamber 208 and with the valve portion 210 of the boot 202 which is located outboard of (i.e. not between) the first and second connection areas 204, 206 of the boot 202. In the example shown, the valve portion 210 is outboard of the clamp 140 (i.e. on the other side of the clamp as the chamber 208) and has an outer surface 216 exposed to the atmosphere or other vent space. As in the previously described embodiments, the valve portion 210 of the boot 202 engages and seats against the contact surface 157 of the insert 150 in a first state of the boot 202 (or the valve portion 210 of the boot). The contact surface 157 of the insert 150 is also located outboard of the clamp 140 and outboard of the first and second connection areas 204, 206 of the boot 202. When the differential force across an area of the valve portion 210 is sufficient to displace at least part of the valve portion to its second state, out of engagement with the contact surface 157, the lubricant chamber 208 is vented through the valve portion 210 and to the atmosphere.

In at least some implementations, a valve portion 144, 210 of a boot member 104, 202 is located outboard of (i.e. not between) two connections areas (e.g. 134, 138, and 204, 206) of the boot member 104, 202 or boot assembly 65, 201. A vent path 152 is provided from a chamber 130, 208 between the two connection areas to the valve portion 144, 210. The valve portion 144, 210 has a first state wherein venting is inhibited or prevented and a second state wherein venting is permitted. The force needed to cause the valve portion 144, 210 to move from its first state to its second state can be calibrated to provide a desired venting of a chamber 130, 208. In at least some implementations, the system is constructed and arranged so that the force on the valve portion 144, 210 when the joint is rotating above a threshold speed is sufficient to open the valve portion (e.g. move it to the second state) and permit venting, but at joint rotational speeds below the threshold, the valve portion will remain in its first state, absent other forces (e.g. fluid pressure) of sufficient magnitude acting thereon. The vent path(s) 152 may be defined at least partially in or by an insert 150 received between a clamp 140 (or other connector) and a component (e.g. inner race 62 or shaft 30) to which the boot member 104, 202 is connected, to define a vent path that passes beneath the clamp 140 from a chamber 130 on one axial side of the clamp 140 to a valve portion 144, 210 on the opposite axial side of the clamp 140.

The insert 150 may be separate from or coupled to the boot member 104, 202 prior to assembly on the joint 10 or 200. In at least some implementations, the insert 150 may be overmolded by, adhered to, welded to or otherwise connected to the boot member 104, 202 so that the insert and boot member may be handled and assembled as a single, integrated component rather than separate components. This may facilitate handling and assembly of the boot member 104, 202 and insert 150, and ensure proper alignment and cooperation between them. Further, while the joint 10 shown in FIG. 2 illustrates a boot member 104 connected to the inner race 62 and the joint 200 shown in FIG. 6 illustrates a boot member 202 connected to a shaft 30, other arrangements are possible and may be implemented in view of this disclosure. For example, without limitation, the inner race 62 used in the joint 200 shown in FIG. 6 may include an axially extending projection 88 similar to the inner race 62 of FIG. 2 and the boot member 202 may be coupled to the inner race 62 instead of the shaft 30. Still other arrangements will become apparent to persons of ordinary skill in this art upon review of this disclosure.

It is to be understood that the above description is intended to be illustrative and not restrictive. Many embodiments and applications other than the examples provided would be apparent to those of skill in the art upon reading the above description. The scope of the invention should be determined, not with reference to the above description, but instead with reference to the appended claims, along with the full scope of equivalents to which such claims are entitled. It is anticipated and intended that future developments will occur in the arts discussed herein, and that the disclosed assemblies and methods will be incorporated into such future embodiments. In sum, it should be understood that the invention is capable of modification and variation that is limited only by the following claims.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. A joint for coupling two shafts in a vehicle driveline, comprising:
   a joint part defining part of a fluid chamber;
   a boot member coupled to the joint part at a connection area and defining at least part of the fluid chamber inboard of the connection area and having a valve portion that has an open state and a closed state; and
   an insert received adjacent to the boot member and defining at least part of a vent path that communicates the fluid chamber with the valve portion wherein, the valve portion is located outboard of the connection area and when the valve portion is in the closed state venting from the fluid chamber is inhibited or prevented and when the valve portion is in the open state the fluid chamber is communicated with a venting space and wherein the valve portion includes a portion of the boot member that engages the insert in the closed state to inhibit or prevent fluid flow between said portion of the boot member and the insert, and wherein at least part of the valve portion is disengaged from the insert when sufficient force acts on said at least a portion of the valve portion.

2. The joint of claim 1 wherein the insert includes a circumferentially continuous surface and the valve portion is defined by an annular surface of the boot member that, in an unstretched condition, has an inner diameter that is equal to or less than an outer diameter of the circumferentially continuous surface of the insert that is engaged by the valve portion.

3. The joint of claim 1 wherein the insert includes a void that defines at least part of the vent path.

4. The joint of claim 3 wherein the insert is annular and the void is a slot that extends axially to communicate with the fluid chamber and with the valve portion.

5. The joint of claim 3 wherein the insert is formed of a material that is harder than the material of the boot member so that the insert resists being compressed to avoid closing the void and the vent path being closed in assembly of the joint.

6. The joint of claim 1 wherein the joint is a constant velocity joint having an outer race, an inner race and a plurality of balls received between the outer race and inner race and wherein the boot member is connected at one end to the outer race.

7. The joint of claim 6 wherein the boot member is adapted to be coupled at another end to a shaft coupled to the joint.

8. The joint of claim 1 wherein the joint is a constant velocity joint having an outer race, an inner race and a plurality of balls received between the outer race and inner race and wherein the boot member is connected at one end to the inner race.

9. The joint of claim 8 wherein the boot member is adapted to be coupled at another end to a shaft coupled to the joint.

10. The joint of claim 1 wherein the insert is connected to the boot member by an adhesive or by being overlapped by material of the boot member.

11. The joint of claim 1 which also includes a seal received between the insert and the inner race, and wherein the insert includes an inwardly facing and circumferentially continuous sealing surface arranged to engage the seal.

12. The joint of claim 11 wherein the seal and insert are connected together to form a unitary component.

13. The joint of claim 1 wherein said joint part is a first joint part which has a bore and said boot member is a first boot member, and which also includes a second joint part received in the bore of the first joint part, and a second boot member that is separate from the first boot member and is connected between the first joint part and the second joint part, and wherein said first boot member is coupled to the second joint part and a shaft that is coupled to the second joint part.

14. The joint of claim 1 wherein said joint part is a first joint part which has a bore and which also includes a second joint part received in the bore of the first joint part, and a seal received between the insert and the second joint part and wherein the boot member is coupled to the second joint part.

15. A joint for coupling two shafts in a vehicle driveline, comprising:
an outer race having a bore;
an inner race received at least partially within the bore;
a cage received between the inner race and the outer race;
a plurality of balls received between the inner race and the outer race and retained by the cage;
a boot member coupled to the outer race, the inner race or both the outer race and the inner race at a connection area, defining at least part of a fluid chamber and having an annular portion; and
an insert received adjacent to the boot member, defining at least part of a vent path that communicates the fluid chamber and having a circumferentially continuous contact surface engaged by the annular portion of the boot member outboard of the connection area to define a valve portion of the boot member that has an open state and a closed state, wherein when the valve portion is in the closed state venting from the fluid chamber is inhibited or prevented and when the valve portion is in the open state the fluid chamber is communicated with a venting space.

16. The joint of claim 15 wherein the connection area is a first connection area at which the boot member is coupled to the inner race and the boot member has a second connection area at which the boot member is connected to a shaft, and the valve portion is located outboard of and not between the first connection area and second connection area.

17. The joint of claim 16 which also includes a connection member circumferentially surrounding and coupled to the boot member at the first connection area and wherein a vent chamber is defined at least in part on one axial side of the connection member and the valve portion is located on the other axial side of the connection member.

18. The joint of claim 15 wherein the valve portion includes the annular portion of the boot member that resiliently engages the insert in the closed state to inhibit or prevent fluid flow between said portion of the boot member and the insert, and wherein at least part of the valve portion is disengaged from the insert when sufficient force acts on said at least a portion of the valve portion.

19. The joint of claim 18 wherein the valve portion is defined by the annular portion of the boot member that, in an unstretched condition, has an inner diameter that is equal to or less than the outer diameter of the circumferentially continuous surface of the insert that is engaged by the valve portion.

20. The joint of claim 15 wherein the insert includes a void that defines at least part of the vent path.

21. The joint of claim 20 wherein the insert is annular and the void is a slot that extends axially to communicate with the fluid chamber and with the valve portion.

22. The joint of claim 15 wherein the boot member is a first boot member that is coupled to the inner race and a shaft that is coupled to the inner race, and which also includes a second boot member that is separate from the first boot member and is coupled to both the outer race and the inner race.

23. The joint of claim 15 which also includes a seal engaged with an inwardly facing surface and circumferentially continuous sealing surface of the insert.

24. The joint of claim 23 wherein the seal is engaged with the sealing surface outboard of the connection area.

* * * * *